THOMAS A. McFARLAND.

Improvement in Wagon Springs.

No. 115,758. Patented June 6, 1871.

WITNESSES.
Edwin James
H. Brown

INVENTOR.
Thomas A. McFarland.
per J. & J. Holmes
Attorney.

UNITED STATES PATENT OFFICE.

THOMAS A. McFARLAND, OF ERIE, PENNSYLVANIA.

IMPROVEMENT IN WAGON-SPRINGS.

Specification forming part of Letters Patent No. 115,758, dated June 6, 1871.

*To all whom it may concern:*

Be it known that I, THOMAS A. MCFARLAND, of the city and county of Erie and State of Pennsylvania, have invented certain new and useful Improvements in Wagon-Springs; and I do hereby declare that the following is a full, clear, and exact description of the same, reference being had to the accompanying drawing and to the letters of reference marked thereon making part of this specification, in which—

Figure 1:
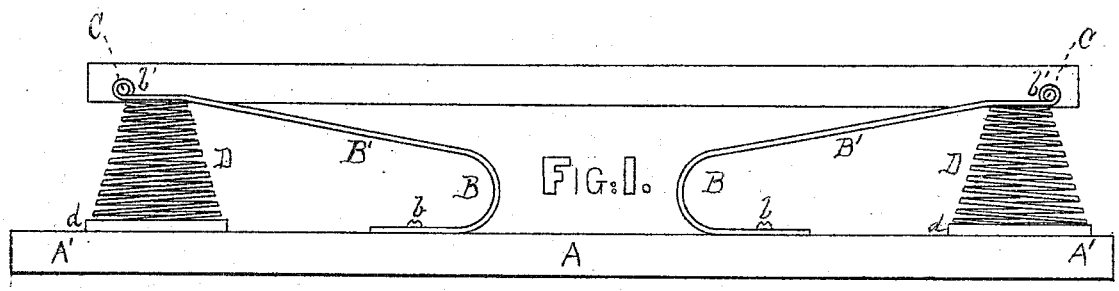
Figure 2:
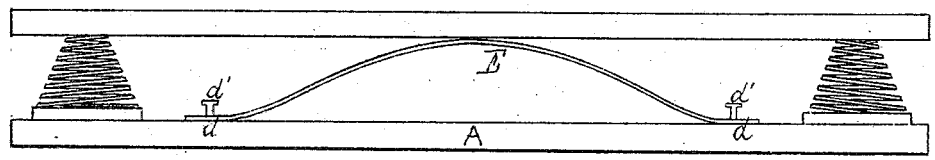
Figure 3:
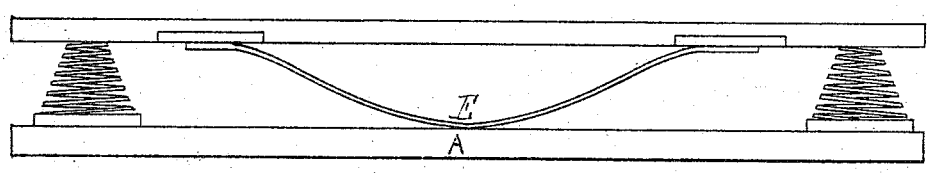
Figure 4:
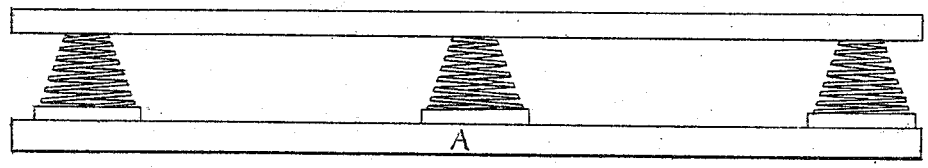
Figure 5:
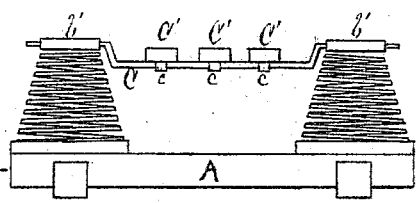

Figure 1 is a side view of my spring complete and ready for use on a vehicle. Figs. 2, 3, and 4 are end views of my spring, in which different styles of center springs are shown. Fig. 5 is an end view, in which the springs are all united by transverse connecting-rods and horizontal slats so as to secure their uniform action.

The object of my invention is to furnish a cheap and durable compound spring for wagons and other vehicles, so connected that the several springs shall work in harmony with each other, each gradually and uniformly acting as the pressure which they are required to support is increased or lessened, and at the same time so operating on the vehicle that is sprung with the same as to impart to the body or other receptacle of the load a gentle rocking or swinging motion. To accomplish this —and in this my invention consists—I arrange on the bed-piece, bolster-plate, or other like support, four steel-plate springs. These springs are curved or bent into a bow or hook form at one end, which leaves a short arm that is rigidly secured to the bed-piece, and a long free lever-arm, through which the necessary elasticity of the metal is exerted or availed of to secure in operation a spring of the desired tension. These springs are to be secured at such relative positions that the outer section or face of each lever-arm shall project a little beyond the end of the bed-piece. The ends of each pair or set of these springs are so connected by transverse rods, which in their turn are so united by slats running horizontally across the bed-piece, that as the springs yield to the pressure of the load they shall do so in a rocking or swinging movement. My invention also consists in distributing additional springs in such relative position to and in such direct contact with the springs named, as well as with their connecting-bars, that these springs shall not only be greatly strengthened in operation, but which will also in itself constitute a compound system for springing a vehicle unequaled for cheapness, durability, and comfort.

To enable others skilled in the art to make and use my invention, I will now proceed to describe its construction and operation.

A is the bed-piece, bolster-plate, or other like support, which may be a solid board, or in the form of a rectangular frame. B B are four plate springs, and are to be constructed of any suitably-tempered steel. These plates are so curved as to give to each a bow or hook form, as clearly shown in Fig. 1. The short arm of each is firmly secured to the support by rivets $b$ $b$ or equivalent attachment. The long arm B' in each spring is left free as the lever-arm, through which the elasticity of the metal is exerted, so as to furnish the required tension for the spring. The ends of these lever-arms B' B' each terminates in an eye, $b'$, which receives and serves to secure the metallic cross or transverse rods C C. These rods C C are of the form shown in Fig. 5, which is straight throughout nearly its entire length, but so bent near its ends as to furnish, as it were, a crank-handled shaped termination at each end. C' C' are two or more slats of metal, wood, or other suitable material, and are so arranged as to lie horizontally across the bolster-plate. These slats are confined in position by means of small staples $c$ $c$, through which the rods C C pass, as clearly shown in Fig. 5. It will be seen that by this arrangement or connection through the rods C C and slats C' C' the springs are all so united as to secure their uniform action, and which causes them to yield in operation through a rocking or swinging movement. D D are four coiled spiral springs, and are secured on circular plate-bearings $d$ $d$ at the corners A' A' of the bed-plate. The relative position of these springs, as well as their dimensions, should be such that a slight movement of the springs B B should be allowed before said springs are driven in the position shown in Fig. 1, and which is in direct contact with the springs D D. This enables the same vehicle to be well adapted to convey a load of greater or lesser weight, and to work with equal ease and security under all circumstances. The springs may be further strengthened by center end springs E E, which may be either arched or elliptical, as shown in Figs. 2 and 3, or a coiled spiral, as shown in Fig. 4. When the arched or elliptical springs are used they are slotted at $d$, which, in connection with the retaining-bolt $d'$, allows the necessary play for the free action of the springs.

When the elliptical springs are used they may be made much longer than those shown on the drawing, and, if desired, of such dimensions as to extend the entire width of the bolster-plate.

Of course, instead of the coiled spiral spring, rubber or other equivalent springs may be used with equal advantage.

I desire it to be understood that the spring herein described is equally applicable to other purposes besides vehicles; and I also desire to cover the arrangement wherever and for whatever purpose used.

Having thus fully described my invention, what I claim therein as new, and desire to secure by Letters Patent of the United States, is—

1. The springs B B and D D, when formed and secured as shown, rods C C and slats C' C', when the same are so combined, arranged, and connected as to operate substantially as described.

2. The springs B B and D D, when the same are so combined and arranged so as to operate substantially as described.

3. The springs B B, D D, and E, when the same are so combined and arranged as to operate substantially as described.

In testimony whereof I have signed my name to this specification in the presence of two subscribing witnesses.

THOMAS A. McFARLAND.

Witnesses:
LEON DE V. SHATTUCK,
J. H. CULBERTSON.